United States Patent [19]

Blöchle et al.

[11] Patent Number: 5,012,583
[45] Date of Patent: May 7, 1991

[54] COMPASS SAW

[75] Inventors: Hans Blöchle, Ditzingen; Paul Stooss, Langendorf, both of Fed. Rep. of Germany

[73] Assignee: Robert Bosch GmbH, Stuttgart, Fed. Rep. of Germany

[21] Appl. No.: 427,843
[22] PCT Filed: Feb. 21, 1988
[86] PCT No.: PCT/DE88/00175
   § 371 Date: Oct. 5, 1989
   § 102(e) Date: Oct. 5, 1989
[87] PCT Pub. No.: WO88/07906
   PCT Pub. Date: Oct. 20, 1988

[30] Foreign Application Priority Data

Mar. 21, 1988 [DE] Fed. Rep. of Germany ....... 3712236

[51] Int. Cl.⁵ .................. B27B 11/02; B27B 19/09
[52] U.S. Cl. ................................. 30/392; 30/124; 30/374

[58] Field of Search .......... 30/123, 124, 133, 374-372, 30/392-394

[56] References Cited

U.S. PATENT DOCUMENTS 4,090,297 5/1978 Wanner et al. ............... 30/374 X
4,665,617 5/1987 Maier et al. .................. 30/392 X
4,730,397 3/1988 Weiford et al. ................ 30/392

FOREIGN PATENT DOCUMENTS 2546527 4/1977 Fed. Rep. of Germany .

Primary Examiner—Douglas D. Watts
Attorney, Agent, or Firm—Michael J. Striker

[57] ABSTRACT

A compass saw comprising a separate removable suction channel located between a base plate and a saw housing pivotally supported on the base plate, the suction channel having a substantially unobstructed suction path.

19 Claims, 5 Drawing Sheets

COMPASS SAW

BACKGROUND OF THE INVENTION

The invention relates a compass saw comprising a housing connected with a base plate to be placed on a workpiece, a motor driven saw blade, and a suction device located between the housing and the case plate for removal of sawdust and chips. A compass saw comprising a dust suction channel formed in the base plate is already known from DE-OS 25 46 527. However, swiveling of the housing relative to the base plate for executing bevel cuts is not possible with this saw and, moreover, would be impeded by the suction channel. Furthermore, the irregular and bent shape of the suction channel leads to whirling and to a reduction of the suction output. Also, the depositing of sawdust is promoted, which increases the risk of stoppage in the channel.

SUMMARY OF THE INVENTION

The object of the invention is a compass saw capable of executing bevel cuts. The object of the invention is achieved by swiveling the saw housing relative to the base plate. This increases the possibilities of use of the saw while maintaining the channel suction. The suction duct is constructed so as to be completely separate from the carrying stirrup for the motor housing and has no inwardly projecting edges or projections. The effectiveness of suction is accordingly improved decisively, which leads to a complete removal of the saw chips due to the increased suction force. Beyond this, accumulation of sawdust in the suction channel, and accordingly constricting of the channel forming a resistance to flow, is prevented. Should sawdust accumulate nevertheless in unusual cases, e.g. when the sawdust is moist, it can be removed in a very simple manner with a compressed air burst or a water jet. For this purpose, or if the removal of sawdust is not needed, the suction channel can be easily removed from the base plate. The removed suction channel facilitates handling, particularly when sawing with upwardly directed saw blade, since the saw can be grasped by the hand in its center of gravity without the suction channel or the connection pieces interfering (see FIG. 1). The suction channel is advantageously constructed as a light and inexpensive plastic part that can simply and cheaply be produced by injection molding.

Providing countersinking of the fastening screw for fastening the base plate with the suction channel is particularly advantageous because the fastening screw does not project into the duct. A simple handling of the fastening screw is achieved by a slide which promotes flow and which is arranged so as to be displaceable between the base plate and the cover plate and releases an opening for inserting a tool.

The construction of the suction channel with a substantially uniform inner contour without abrupt changes in diameter, reduces the pressure losses in the duct to a minimum. Chips or sawdust which still lie on the tool, are shoveled into the suction channel, so to speak, via a bevel of the channel base at the suction port.

By inclining the suction channel axis relative to the base plate, the suction port is advanced close to the cutting place in the tool, so that the suction channel extends into the workpiece, so to speak, without transition. The other end of the suction channel and the hose connection piece are far enough removed from the support surface of the base plate so as to work without hinderance and so that a suction hose can be mounted.

The recesses or projections which are arranged in the outer contour of the suction channel and correspond to corresponding projections or recesses at the base plate, are also advantageous.

A threaded pin with clamping plate and a helical wheel in the housing base are advantageously used for fastening the base plate, instead of a clamping jaw with screw inserted from the suction channel. Because of the shallow construction of the clamping plate, there is accordingly enough room for a sufficient cross-section of the suction channel. Moreover, the operation of the clamping device is substantially more comfortable, since a tool is no longer required. The helical wheel can easily be operated manually because of its large diameter.

In order to be able to reliably loosen a possibly jammed helical wheel when adjusting the base plate, it is advantageous to arrange hexagonal or circular blind holes at the circumference in which a hexagon wrench, which is usually available anyway for other adjustments on the saw, or a screw driver can be inserted, and an additional leverage can be achieved.

In the construction of a compass saw with a suction channel as well as a chip blowing channel there is an advantage that a choice can be made between two modes of operation which keep the cutting location free of chips without great expense and without converting the saw. The feed air can be turned off with the flap 37 during suction operation so as to prevent the suction output from being impaired. Of course, the blowing device can also be operated when the suction channel is removed.

The present invention as to its construction so to its mode of operation, together with additional objects and advantages thereof, will be best understood from the following detailed description of the preferred embodiments with reference to the accompanying drawings.

BRIEF DESCRIPTION OF THE DRAWINGS

Two embodiment examples of the invention are shown in the drawing and explained in more detail in the following.

DESCRIPTION OF THE PREFERRED EMBODIMENTS

Figure 1:
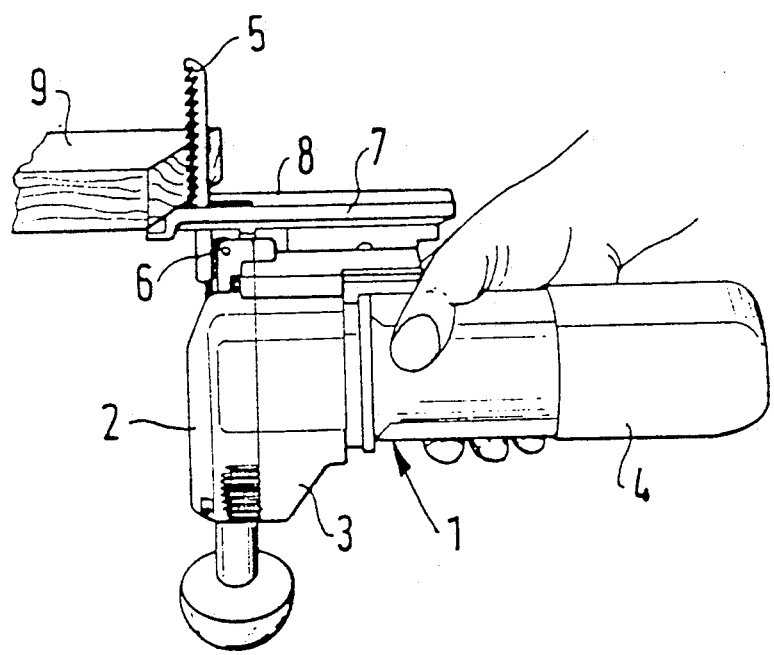
FIG. 1 shows a perspective view of a compass saw held with the saw blade upward, that is, turned around, according to the present invention.

The housing 1 consists of a plurality of parts 2, 3, 4 and receives the motor and gear unit of the compass saw. A reciprocating saw blade 5 which is connected with the gear unit and is guided at a supporting roller 6 projects forward out of the housing 1. In the area of the saw blade 5, a swivelable base plate 7, which can contact a workpiece 9 with its flat base 8, is fastened at the housing 1.

Figure 2:
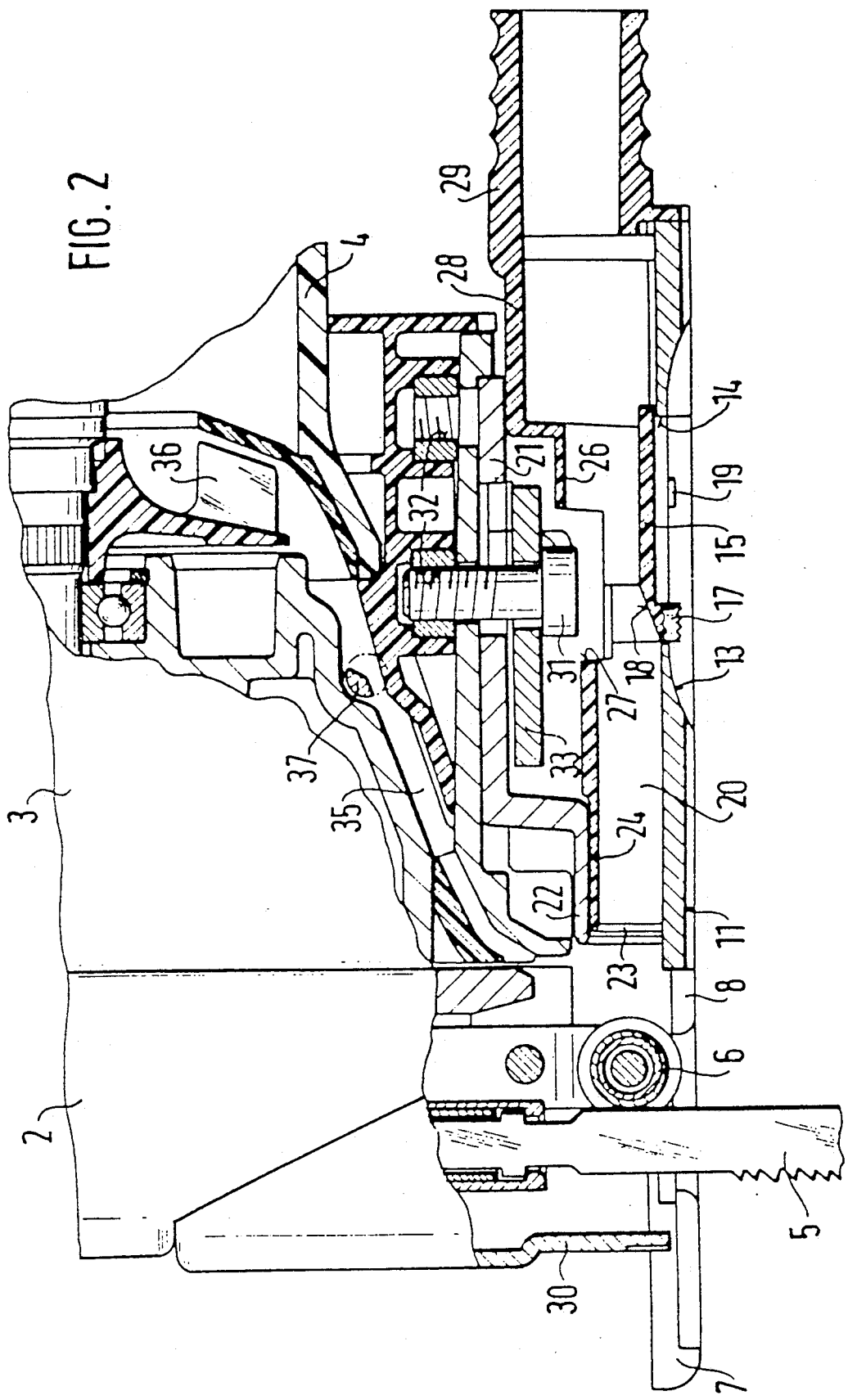
FIG. 2 shows a longitudinal cross-sectional view of the compass saw according to FIG. 1 with downwardly directed saw blade.
Figure 3:
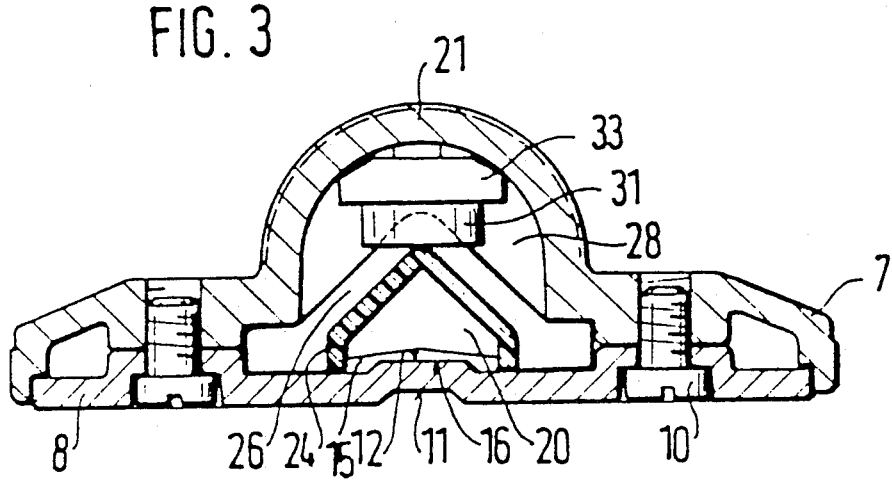
FIG. 3 shows a cross-sectional view of the base plate along line III—III in FIG. 2.

As can be seen from FIG. 2, the base 8 is formed from a cover plate made of plastic and is fastened to the base plate 7 with a plurality of screws 10. The cover plate is slotted in the front area around the saw blade 5—as is the base plate—and comprises a longitudinal groove 11 in the rear area at the bottom in the center and a corresponding rib 12 on the upper side facing the housing 1 (see FIG. 3). The cover plate 8 has two recesses 13 in the rear part from the bottom and an opening 14.

The opening 14 can be closed by a closing body which is constructed as a longitudinally movable slide 15 and comprises a groove 16 (see FIG. 3) in which the rib 12 engages. The slide 15 has a gripping strip 17 extending into the recess 13 for the purpose of handling. At its front side, the slide 15 has a bevel 18 with a flat angle above the gripping strip. In the closed position, the slide engages with elastic catch elements 19 in reciprocal catch elements in the cover plate 8. The slide is held from the top by the side walls of a suction channel 20 which is open at the bottom.

Figure 4:
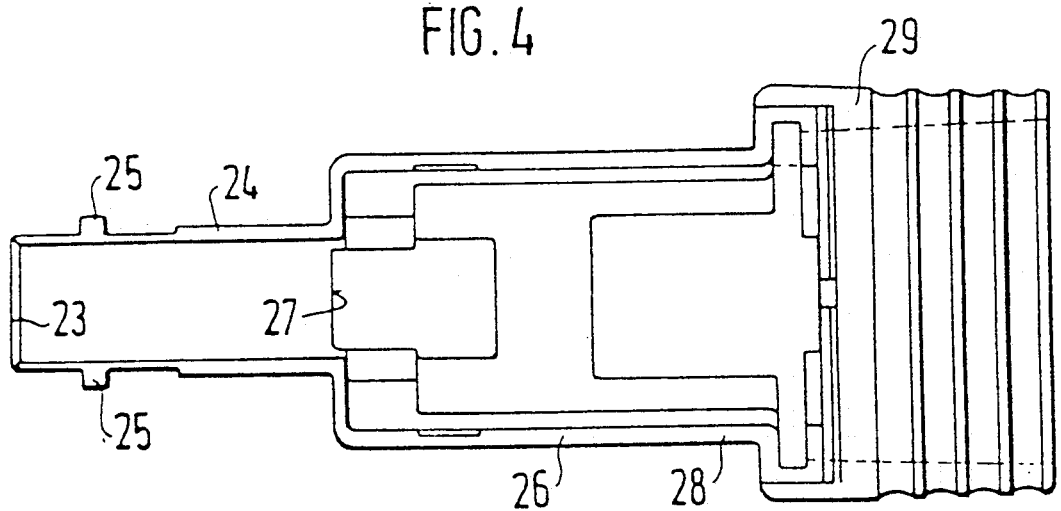
FIG. 4 shows a bottom view of the suction channel according to the first embodiment.

The suction channel 20 is formed from a plastic material and is inserted in a carrier 21 which is connected with the base plate 7 so as to form one piece. The carrier has a spherically curved upper surface shaped as a cylindrical jacket, and a projection 22 at the front with a substantially triangular cross-section. The channel 20 contacts the projection 22 with its front portion 24 which also forms the suction port 23. This portion 24 carries two pins 25 at the side (see FIG. 4) which engage in recesses in the base plate 7, which recesses are not shown. A central portion 26 with expanded cross-section adjoins the front portion 24 and comprises an opening 27 at the top. The rear portion 28 adjoining the latter has a larger cross-section compared with the central portion 26 and is curved at the top corresponding to the shape of the carrier 21. A connection piece 29 for the connection of a suction hose, not shown, and a suction fan is connected with the rear portion 28 so as to form one piece. The suction device is supplemented by a transparent hood 30 which is arranged in front of the saw blade and is already known from DE-PS 25 46 527.

The base plate 7 is fastened to the housing part 3 so as to be swivelable in a manner known per se in compass saws. A screw 31, which can be screwed into threaded holes 32 in the housing 1, serves as fastening means. The screw 31 can be constructed e.g. as a hexagon or a hexagon recess screw. It engages through the carrier 21, which is perforated in this place, and a clamping plate 33 which contacts the inside of the carrier.

The saw is equipped not only for suction, but also for blowing away the chips. An air inlet duct 35 is arranged in the housing 1 for this purpose, into which air is introduced from a ventilator driven by the motor. The air inlet duct 35 opens out above the suction channel 20 and is directed toward the saw blade 5. A flap 37, with which the air flow can be adjusted or entirely turned off, is located in the duct 35. This is particularly important during the operation of the suction device, whose effect would be considerably limited due to the air flow directed in the opposite direction through the inlet duct 35.

The suction channel 20 is easy to insert in the base plate and to remove again. For this purpose, it is only necessary to unscrew the screws 10 with which the cover plate 8 is fastened at the base plate and to lift the cover plate 8. The simply inserted channel 20 is now removable. After unscrewing the cover plate 8 the saw is usable in the same was as with the suction channel 20, but with the advantage that the guidance of the saw by hand during bottom cutting is not impeded by the suction connection piece 29.

If necessary, the channel can be cleaned easily in the removed state, as can the cover plate 8 forming the lower closing wall of the channel. After opening the slide 15, the fastening screw 30 is also easily accessible when the suction channel 20 is inserted.

The base plate 7 can be swiveled or fixed again relative to the housing 1 for bevel cuts without the suction channel standing in the way as a hindrance. The cover plate 8 can be produced from plastic or—particularly for metal working—also from metal. The cover plate 8 can also be connected with the base plate by catch elements instead of screws. These can be arranged, in a manner similar to the catch elements 130, 131 (in the second embodiment), at the longitudinal sides of the cover plate 8 and at the prolongations of the base plate 7 laterally enclosing the cover plate 8 (see FIG. 3).

Figure 5:
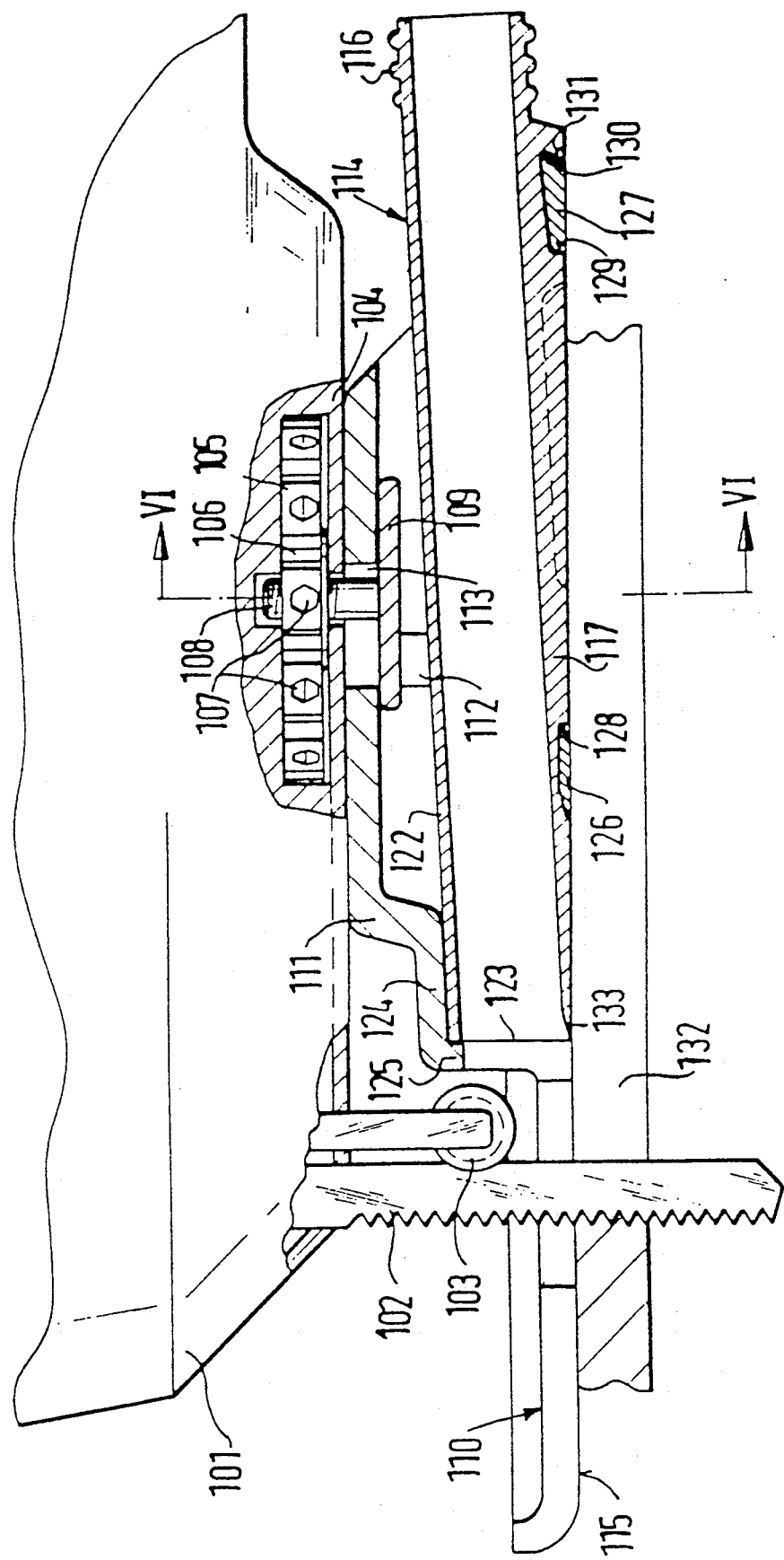
FIG. 5 shows a partial cross-sectional view of a compass saw according to a second embodiment.
Figure 6:
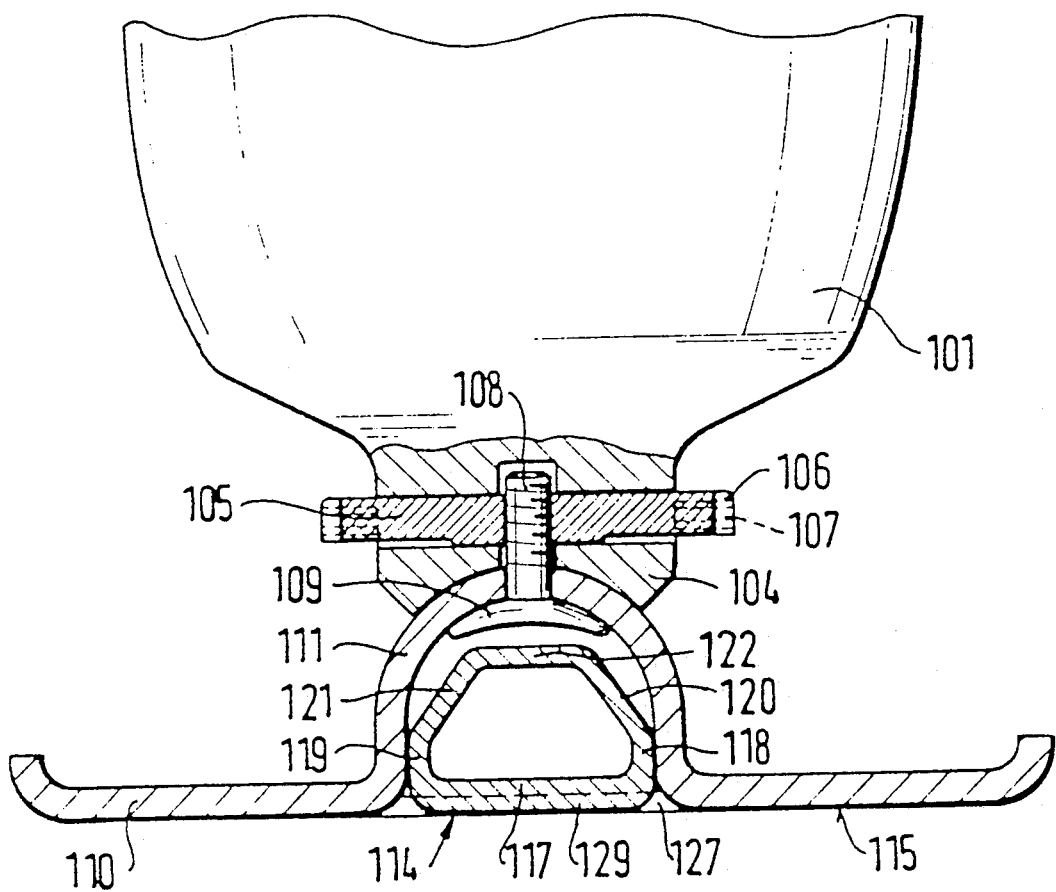
FIG. 6 shows a cross-sectional view along line VI—VI in FIG. 5.

In the second embodiment, according to FIGS. 5 and 6, substantially the motor and gearing of the compass saw are located in a housing 101. The saw blade 102 is guided by a supporting roller 103.

A helical wheel 105, which projects laterally over the housing contour and comprises a knurl 106 for better handling, is inserted in the base 104 of the housing 101. In addition, radially extending round or hexagonal blind holes 107 are arranged in the screw wheel 105 for the insertion of a hollow wrench or other rod-shaped tool.

The screw wheel 105 is in a thread connection with a threaded pin 108, a planar clamping plate 109 being arranged at the lower end of the latter. The clamping plate engages behind a carrier 111, which is curved in a semicircular manner and arranged at a base plate 110, and is adapted to the carrier 111 with respect to its shape. The housing base 104 is curved inward, likewise in a semicircular shape, and can be swiveled in a known manner on both sides of the supporting tunnel by at least 45°. For this purpose, the carrier 111 comprises a main slot 112 extending transversely relative to its reach, as well as a plurality of lateral slots 113, preferably three, which extend vertically relative to the main slot 112 and away from the latter toward the rear. These lateral slots can be arranged at the corresponding places in the carrier 111, e.g. for the purpose of an easier adjustment of the most commonly used saw blade inclinations 0°, +45°, and −45°.

A suction channel 114 extends inside the carrier 111 at a plane angle of approximately 4° to the base 115 of the base plate 110. It opens out close behind the saw blade and ends in a connection piece 116 for connection of a suction hose, not shown. The channel 114 comprises an approximately trapezoidal cross-section (see FIG. 6) with a broad base 117, two short vertical side walls 118 and 119, two diagonal side walls 120 and 121, and a cover 122 which is aligned parallel to the base 117. The side walls 120, 121 and the cover 122 can also form a half-oval shape. The inner contour of the duct 114 is straight, without bend or steps, from the opening 123 to the connection piece 116. The cross-section is uniform; the base 117 tapers to a point toward the bottom 115 only at the port 123. The connection piece 116 can also have an oval or circular cross-section, wherein the transition to the trapezoidal cross-section is constructed so as to be continuous and without abrupt changes in cross section. The exhaust device can also be supplemented here by a hood in the area of the saw blade 102, which hood is not shown but is known from DE-OS 25 46 527.

The channel is held by fastening elements acting at its outer contour. In the area of the port 123, the channel 114 contacts a projection 124 of the carrier 111. As shown in FIG. 5, the projection 124 can enclose the front side of the cover 122 and the side walls 118 to 121 of the channel 114 with a projection 125. The projection 124 simultaneously fulfills the task of stiffening the base plate 110 which is open in the area of the channel 114 and of the saw blade 102. The channel 114 contacts the carrier 111 laterally with its side walls 118 and 119. The duct 114 is secured from falling out at the bottom by two transverse stirrups 126 and 127 which engage and catch in recesses 128 and 129 at the duct base 117. For this purpose, the transverse stirrup 127 has a catch projection 130 and the base 117 has a catch projection 131.

The transverse carriers 126, 127 serve, in addition, to stiffen the base plate. However, dispensing with the transverse carriers, the suction channel 114 can also be held e.g. by lateral guide rails which engage in or under the side walls 118, 119.

When not in use, the channel 114 can be removed by lifting the connection piece 116, disengaging the projection 131 and pulling it out toward the rear out of the base plate 110. This is particularly necessary when the channel 114 passes directly into a suction hose, not shown, without connection piece 116, which further improves the suction output.

In order to use the suction mechanism, the channel 114 is connected directly, or via a hose, to the suction device, e.g. a household vacuum cleaner. Sawdust and chips are completely sucked off due to the innovation. Chips which possibly remain on the workpiece 132 are removed into the suction channel 114 via the bevel 133 at the channel opening 123 and carried along by means of the higher vacuum pressure in the interior of the channel.

In order to adjust the motor housing 101 relative to the base plate 110, the helical wheel is turned to the left, so that the clamping plate 109 disengages from the carrier 111. By drawing back the base plate, the threaded pin 108 arrives in the main slot 112, in which a desired saw blade inclination can be adjusted. After completing the adjustment and positioning of the threaded pin 108 either in the main slot 112 or in one of the side slots 113, the helical wheel 105 is turned to the right again, so that a secure fixing of the base plate 110 is achieved by clamping of the clamping plate 109 at the carrier 111.

While the invention has been illustrated and described as embodied in a compass saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A compass saw comprising a housing; a motor and a gear unit located in said housing; a base plate; a carrier connected with said base plate and having a convexly curved outer surface for pivotally supporting said housing on said base; connecting means for adjustably securing said housing to said carrier; a saw blade driven by said motor; and a suction device including a suction channel for removing saw dust and chips, located in a space between said housing and said base plate, and having a suction port located behind said saw blade, and an opening through which said connecting means is inserted; said suction channel comprising a separate removable member inserted between said carrier and said base plate and having in an area of said opening for said connecting means such a shape that an inner contour of said member does not intersect said connecting means, and said suction channel having a suction path extending from said suction port, said suction path having a cross-section without flow-impeding projections or constructions.

2. A compass saw as set forth in claim 1, wherein said cross-section of said suction path is widened.

3. A compass saw as set forth in claim 1, wherein said base plate includes a cover plate having an opening, said compass saw further comprising a closing body for closing said opening.

4. A compass saw as set forth in claim 3, wherein said suction channel is located between said cover plate and said carrier, said closing body extending into said suction path and having a bevel facing said suction port.

5. A compass saw as set forth in claim 1, wherein said suction path has a substantially uniform cross-section without abrupt changes in diameter.

6. A compass saw as set forth in claim 1, wherein said suction channel has a bevel at said suction port and facing said saw blade, said bevel tapering to a point.

7. A compass saw as set forth in claim 3, further comprising one of catch means and snap-lock means for connecting said cover plate with said base plate.

8. A compass saw as set forth in claim 1, wherein said suction channel has a substantial straight longitudinal inner contour and an axis inclined with respect to said base plate at a plane angle, said suction port being formed at a lowest point of said suction channel.

9. A compass saw as set forth in claim 8, wherein said plane angle is in a range of 2°–10°.

10. A compass saw as set forth in claim 1, further comprising a connection member for connecting a suction hose with said suction channel.

11. A compass saw as set forth in claim 1, wherein said suction channel is directly connected with a suction hose.

12. A compass saw as set forth in claim 1, wherein said suction channel has thin walls and is formed of a plastic material.

13. A compass saw as set forth in claim 1, wherein said suction channel has an outer surface, said compass saw further comprising fastening means for securing said suction channel with said base and engaging only said outer surface of said suction channel.

14. A compass saw as set forth in claim 1, wherein said carrier has at least one slot, said compass saw further comprising at least one threaded pin extending into said slot and clamping plate fastened at an end of said threaded pin and abutting an inner wall of said carrier.

15. A compass saw as set forth in claim 14, wherein said housing has a base surface, said compass saw further comprising a helical wheel arranged at said base surface, said threaded pin extending through said helical wheel and projecting laterally over said base surface.

16. A compass saw as set forth in claim 15, wherein said helical wheel has a plurality of blind bores on a circumference thereof for receiving a pin-shaped tool.

17. A compass saw as set forth in claim 1, further comprising and air inlet duct for directing an air flow toward said saw blade.

18. A compass saw as set forth in claim 17, further comprising a flap for controlling the air flow through said inlet air duct.

19. A compass saw comprising a housing; a motor and a gear unit located in said housing; a base plate; a carrier connected with said base plate and having a convexly curved outer surface for pivotally supporting said housing on said base; connecting means for adjustably securing said housing to said carrier; a saw blade driven by said motor; and a suction device including a suction channel for removing saw dust and chips, located in a space between said housing and said base plate, and having a suction port located behind said saw blade, said suction channel comprising a separate removable member inserted between said carrier and said base plate, said suction channel having one of a tubular cylindrical closed inner contour and a tubular conically expanding closed inner contoured without abrupt changes in diameter size and direction.

* * * * *